(12) United States Patent
Ludewig et al.

(10) Patent No.: US 6,327,609 B1
(45) Date of Patent: Dec. 4, 2001

(54) SYSTEM AND METHOD FOR USING COOKIES IN JAVA

(75) Inventors: Carl Ludewig, Mill Valley; Rhys Ryan, San Francisco, both of CA (US)

(73) Assignee: AudioBase, Inc., Sausalito, CA (US)

( * ) Notice: Subject to any disclaimer, the term of this patent is extended or adjusted under 35 U.S.C. 154(b) by 0 days.

(21) Appl. No.: 09/405,446

(22) Filed: Sep. 22, 1999

(51) Int. Cl.[7] ................................................ G06F 15/16
(52) U.S. Cl. ........................ 709/203; 709/223; 709/224
(58) Field of Search ................................ 709/223, 224, 709/225, 226, 229, 203, 201

(56) References Cited

U.S. PATENT DOCUMENTS

| | | | | |
|---|---|---|---|---|
| 5,774,670 | * | 6/1998 | Montulli | 709/203 |
| 5,796,952 | * | 8/1998 | Davis et al. | 709/224 |
| 5,948,061 | * | 9/1999 | Merriman et al. | 709/219 |
| 5,999,971 | * | 12/1999 | Buckland | 709/218 |
| 6,006,260 | * | 12/1999 | Barrick, Jr. et al. | 709/224 |
| 6,012,052 | * | 1/2000 | Altschuler et al. | 707/2 |
| 6,085,224 | * | 7/2000 | Wagner | 709/203 |
| 6,101,534 | * | 8/2000 | Rothschild | 709/229 |
| 6,112,240 | * | 8/2000 | Pogue et al. | 709/224 |
| 6,141,010 | * | 10/2000 | Hoyle | 345/356 |
| 6,144,944 | * | 11/2000 | Kurtzman, II et al. | 705/14 |
| 6,144,988 | * | 11/2000 | Kappel | 709/202 |
| 6,161,139 | * | 12/2000 | Win et al. | 709/225 |
| 6,163,772 | * | 12/2000 | Kramer et al. | 705/79 |

OTHER PUBLICATIONS

Joe Burns, "So You Want A Cookie, Huh?" http://htmlgoodies.earthweb.com/tutors/cookie.html, Jun. 18, 1997.*

* cited by examiner

*Primary Examiner*—Mehmet B. Geckil
(74) *Attorney, Agent, or Firm*—Blakely, Sokoloff, Taylor & Zafman LLP

(57) ABSTRACT

A system for using cookies in Java is disclosed comprising a first server which: transmits an applet to a client, the applet including content of a particular type and/or subject matter and configured to store cookie data relating to the client; and subsequently interprets the cookie data to select the type and/or subject matter of applet content to transmit to the client the next time the first server transmits applet content to the client.

16 Claims, 7 Drawing Sheets

SYSTEM AND METHOD FOR USING COOKIES IN JAVA

BACKGROUND OF THE INVENTION

1. Field of the Invention

This invention relates generally to the field of Java programming. More particularly, the invention relates to an improved system and method for storing client-side data in Java.

2. Description of the Related Art

Java

Java is an object-oriented programming language which has attracted considerable amount in recent years. One key feature of Java is that it can be used to create computer programs which are platform-independent. That is, the same Java object code may be used on numerous different operating systems including Windows 95, Unix, Solaris, and Macintosh. This interoperability makes Java an ideal choice for programming Internet applications.

Once a program is written in Java source code, the Java compiler generates a compact, architecture-neutral object code known as a "bytecode." Bytecodes are executed by a runtime interpreter residing on the client computer. This runtime interpreter is commonly referred to as a Java "virtual machine." The Java virtual machine reads each bytecode and interprets the program instructions which comprise that bytecode so that the instructions may be executed by the native client microprocessor. Virtual machines are included in commonly available Internet browser applications such as Netscape Navigator™ or Microsoft Internet Explorer.™

Java was derived from the popular C++ programming language and, as such, retained many significant features of that language. For example, Java, like C++, is object-oriented. Accordingly, Java programs are developed around "classes" and "objects." These two terms are not interchangeable but they are directly related to one another. A class can be thought of as a template or blueprint from which an object is made. When an object is created from a class, new object is called a new "instance" of that class. The object will initially have all of the same characteristics of the class from which it was derived. These characteristics are defined by the data within the object and the functions and procedures—i.e., the methods—associated with the object.

"Applets" are compact Java programs comprised of one or more bytecodes. They are typically embedded in-line as objects within Hypertext Markup Language (hereinafter "HTML") documents on the World Wide Web (hereinafter "the Web") in a similar fashion to HTML-embedded images. Unlike images, however, applets may be interactive, receiving user input, executing calculations based on it and presenting continually changing content. For example, applets are ideal for generating rich media content such as audio and/or video banners. One limitation on applets, however, is that (for security reasons) they are only capable of communicating with a single Web server.

Cookies

Cookies are a useful tool for maintaining state information on the Internet, particularly with respect to the Web. Because the Hyper Text Transport Protocol ("HTTP")—the protocol used for communicating over the Web—is a "stateless" (i.e., non-persistent) protocol, Web servers are generally incapable of differentiating between Web site visits by clients.

This represents a significant limitation to client/server transactions on the Internet. In various situations, Web site owners may need their Web servers to save session information relating to Web site visits by clients. For example, e-commerce Web sites may need to assign client customers transaction IDs and passwords to help associate HTTP transactions with a single client customer. Such sites require some mechanism for determining when, and for how long, clients are "logged on." Similarly, Web sites advertisers may need to track the areas on a particular Web site most frequently visited by client customers to (for example) help build demographic databases and/or to personalize sites with dynamic content.

The "cookie" was developed to address these problems. A cookie is simply a small amount of data that a Web server saves and can later retrieve from a client system. Cookies are typically utilized by server-side code such as Common Gateway Interface ("CGI") programs. They are managed on the client side by Web browsers (referred to generally as "HTTP User Agents").

Cookies are transmitted via two HTPP headers: Cookie and Set-Cookie. Before transmitting a cookie to a client, a server typically asks the client if it is accepting cookies. If so, then the server sends the cookie data via the Set-Cookie header. Included in the header is a description of the range of Universal Resource Locators ("URLs") for which that cookie is valid. If the user subsequently revisits the Web server or any URL within the specified range, the client's browser returns the required state data via the Cookie header.

Although cookies have been widely implemented for Web pages, they have not been used to store state information associated with Java applets. Due to the widespread use of applets embedded in HTML documents on the Internet, and due to the fact that these applets and frequently uploaded to the client by a server other than the server on which the HTML document resides, a system for using cookies with Java applets would be beneficial to the applet provider for at least the reasons stated above. For example, such a system would allow a Web server providing advertising applets to keep track of the different applets (e.g., multimedia ads, sound-bytes . . . etc) downloaded by a particular client.

In addition, it would be useful in some circumstances to configure an applet (e.g., downloaded from a first Web server) to read cookie data generated by a other applets (e.g., downloaded from other Web servers). The first Web server could then learn more about the particular client and could narrowly tailor applet data for the client (e.g., sound or video clips) which accurately matches the client's preferences.

Accordingly, what is needed is a system and method for using cookies in Java. What is also needed is a system and method for using cookies in Java wherein two applets generated by different Web server can exchange cookie data. What is also needed is a system and method for using cookies in Java which can be implemented on currently existing Java platforms.

SUMMARY OF THE INVENTION

A system for using cookies in Java is disclosed comprising a first server which: transmits an applet to a client, the applet including content of a particular type and/or subject matter and configured to store cookie data relating to the client; and subsequently interprets the cookie data to select the type and/or subject matter of applet content to transmit to the client the next time the first server transmits applet content to the client.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENTS

A System and Method for Using Cookies in Java

An improved system and method is described for streaming Java. In the following description, for the purposes of explanation, numerous specific details are set forth in order to provide a thorough understanding of the invention. It will be apparent, however, to one skilled in the art that the invention may be practiced without some of these specific details. In other instances, well-known structures and devices are shown in block diagram form to avoid obscuring the underlying principles of the invention.

Embodiments of the invention include various steps, which will be described below. The steps may be embodied in machine-executable instructions. The instructions can be used to cause a general-purpose or special-purpose processor which is programmed with the instructions to perform certain steps. Alternatively, these steps may be performed by specific hardware components that contain hardwired logic for performing the steps, or by any combination of programmed computer components and custom hardware components.

Elements of the present invention may be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

An Exemplary Network Architecture

Figure 1:
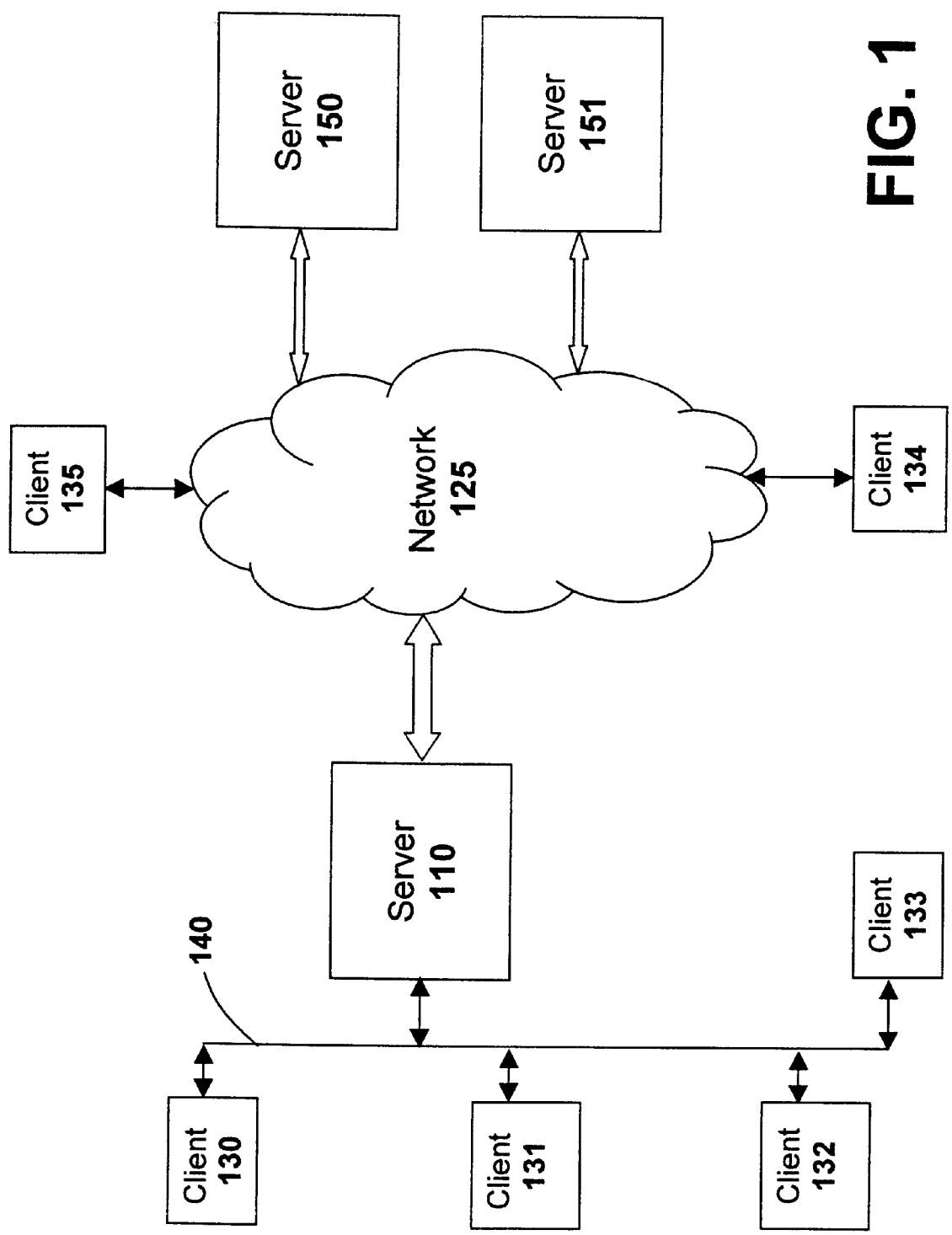
FIG. 1 illustrates an exemplary network architecture used to implement elements of the invention.

Elements of the present invention may be included within a client-server based system 200 such as that illustrated in FIG. 1. According to the embodiment depicted in FIG. 1, one or more servers 110,150, and 151 communicate to one or more clients 130–135. The clients 130–135 may transmit and receive data from the servers 110, 150, and 151 over a variety of communication media including (but not limited to) a local area network 140 and/or a larger network 125 (e.g., the Internet). Alternative communication channels such as wireless communication via satellite broadcast (not shown) are also contemplated within the scope of the present invention.

The servers 110, 150, and 151 may include one or more databases for storing Java code and/or digital audio and/or video data. The databases may also store specific client data (e.g., information on how frequently a particular client logs in to server 110 and that client's preferences) and/or more general data. The database in one embodiment runs an instance of a Relational Database Management System (RDBMS), such as Microsoft™ SQL-Server, Oracle™ or the like.

A client may interact with and receive feedback from servers 10, 150, and 151 using various different communication devices and/or protocols. In one embodiment, the client logs in to servers 110, 150, and 151 via client software. The client software may include a browser application which supports Java such as Netscape Navigator™ or Microsoft Internet Explorer™ on the client's personal computer and may communicate to servers 110,150,151 via the Hypertext Transfer Protocol (hereinafter "HTTP"). In other embodiments included within the scope of the invention, clients may communicate with servers 110, 150, 151 via cellular phones and pagers (e.g., in which the necessary software is embedded in a microchip), handheld computing devices, and/or touch-tone telephones.

An Exemplary Computer Architecture

Figure 2:
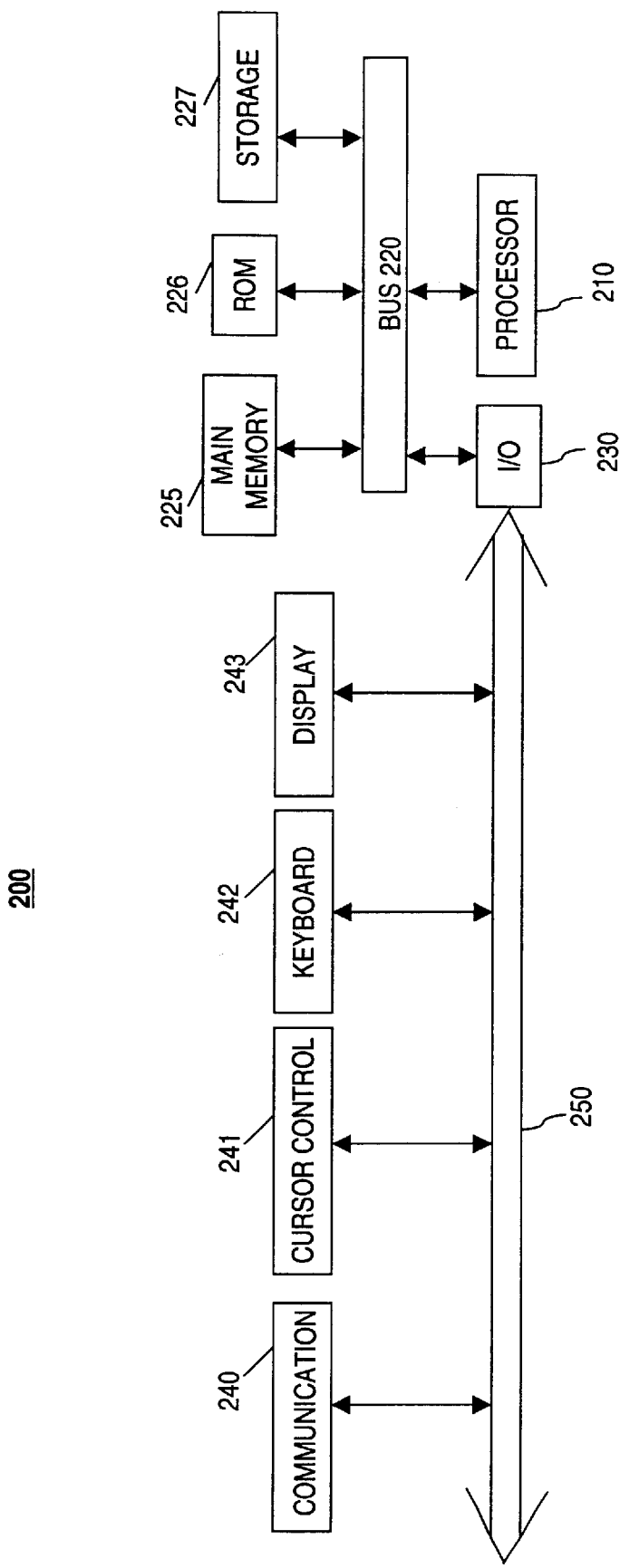
FIG. 2 illustrates an exemplary computer architecture used to implement elements of the invention.

Having briefly described an exemplary network architecture which employs various elements of the present system and method, a computer system 200 representing exemplary clients 130–135 and/or servers 110, 150, and 151 in which elements of the system and method may be implemented will now be described with reference to FIG. 2.

One embodiment of a computer system 200 comprises a system bus 220 for communicating information, and a processor 210 coupled to bus 220 for processing information. Computer system 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Computer system 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Computer system 200 can also be coupled to a second I/O bus 250 via and I/O interface 230. A plurality of I/O devices may be coupled to I/O bus 250, including a display device 243, an input device (e.g., an aphanumeric input device 242 and/or a cursor control device 241).

The communication device 240 may comprise a modem, a network interface card, or other well known interface device, such as those used for coupling to Ethernet, token ring, or other types of networks. In any event, in this manner, the computer system 200 may be coupled to a number of servers via a conventional network infrastructure, such as a company's local area network 140 and/or a larger network 125, for example.

One Embodiment of the System and Method for Using Cookies in Java

Figure 3:
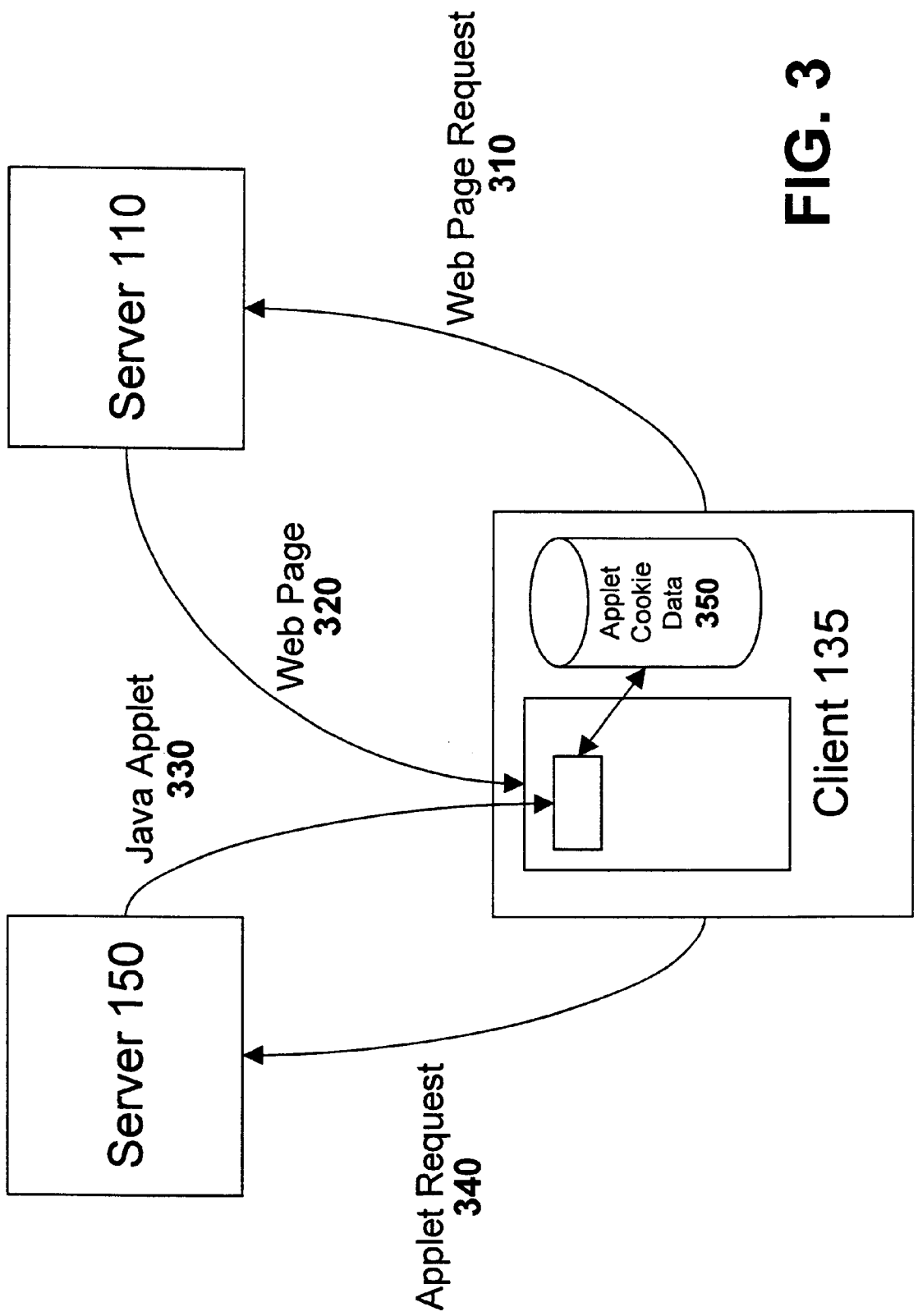
FIG. 3 illustrates one embodiment of a system for using cookies in Java.

FIG. 3 illustrates client 135 communicating over a network 125 to servers 150 and 110. In one embodiment of the system, client 135 initially makes a Web page request 310 from server 110 and, in response, server 110 transmits the requested Web page 320 to client 135. The Web page request 310 may contain more information than a simple Web page address. For example, if server 110 is a search engine (e.g., such as Excite™ or Yahoo™), then Web page request 310 may contain a query for specific information (e.g., "mountain bikes," "airline tickets"... etc). In response, server 110 sends a Web page 320 to client 135 which contains links to Web sites that contain information related to the query (e.g., "www.trekbikes.com," "www.continental.com" ... etc).

Web page 320 may also include embedded Web objects such as audio or video applets which are automatically transmitted to the client 135 when the Web page is downloaded. This is illustrated in FIG. 3 as applet request 340 from client 135 to server 150, and subsequent Java applet 330 download. In one embodiment of the system, server 150 is an advertisement server (i.e., a server which provides embedded Web page advertisements) and the particular Java applet transmitted to client 135 is selected based on the type of Web page 320 transmitted to client 135 from server 110. For example, if client 135 downloaded a Web page 320 with links relating to mountain biking (e.g., in response to a query for "mountain biking"), the Java applet 330 may include sound and/or video content for a particular brand of mountain bike. It should be noted, however, that the specific configuration illustrated in FIG. 3 is for the purpose of example only. Such as configuration (i.e., an applet embedded in a Web page) is not necessary to comply with the underlying principles of the invention.

In one embodiment of the system, Java applet 330 stores cookie data 350 relating to the preferences of client 135. For example, when client 135 downloads a Java applet stored on server 150, the applet cookie 350 on client 135 is updated to include data identifying the subject-matter of the applet (or, e.g., the Web page in which the applet is embedded). The next time client 135 requests an applet from server 150, the request will include the stored cookie data 350. As a result, server 150 will transmit an applet including subject-specific audio and/or video content based on client 135's stored preferences.

Cookie data resulting from numerous similar applet downloads may be analyzed on server 150 (e.g., based on compiled marketing research) so that future applet transmissions to client 135 are uniquely tailored to client 135's interests. For example, if a significant percentage of previous applet downloads included subject matter on outdoor activities (e.g., mountain biking, camping, hiking ... etc) then the next time client 135 transmits a request 340 for an embedded audio and/or video applet, server 150 may transmit an audio applet for Jeep Wrangle™ (or, alternatively, for a Jeep Grand Cherokee™ if the market-based cookie analysis on server 150 indicates that client 135 is in a higher income bracket).

Figure 4:
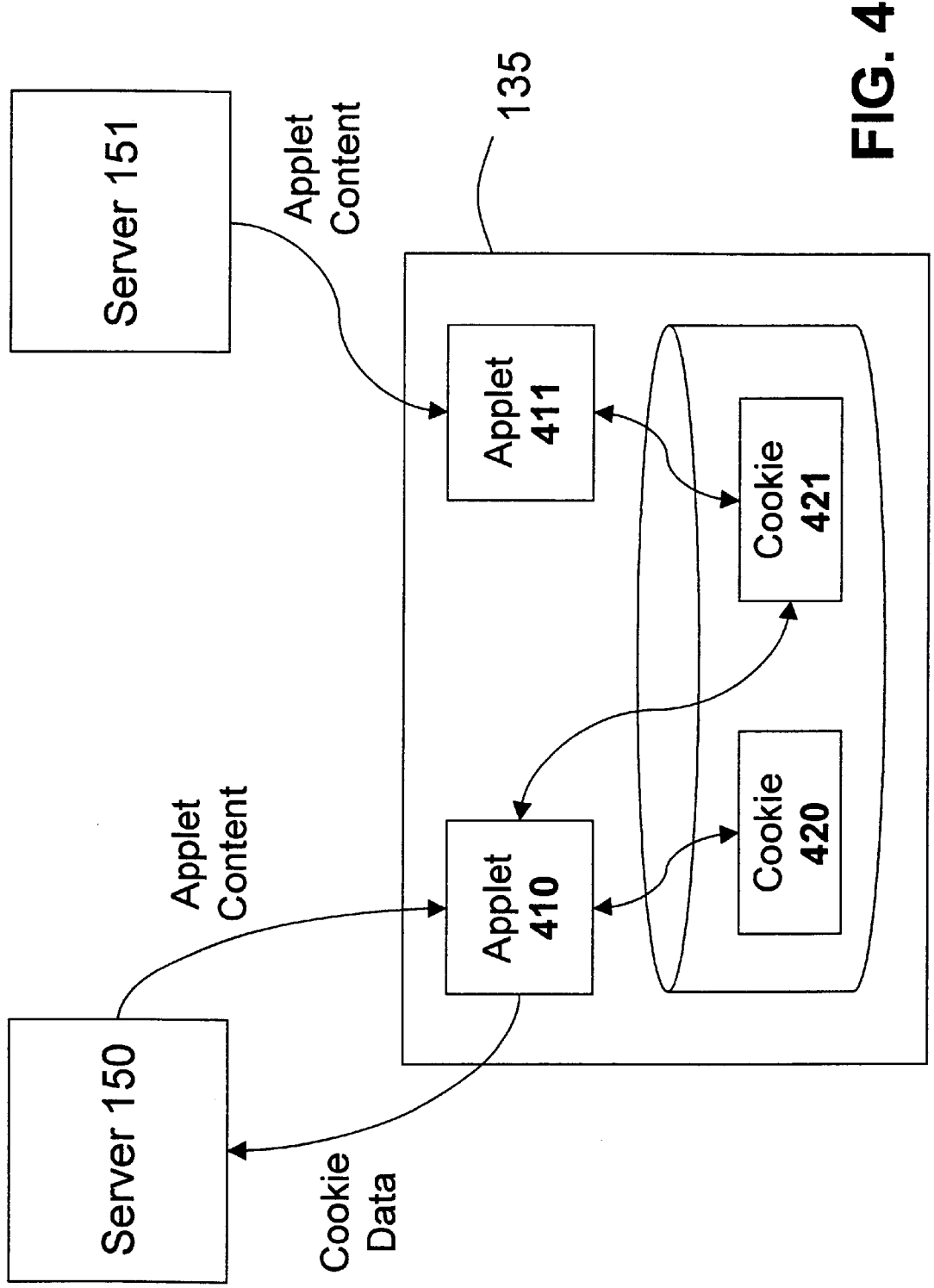
FIG. 4 illustrates another embodiment of a system for using cookies in Java.

Another embodiment of a system for using cookies in Java is illustrated in FIG. 4. In this embodiment, two separate applets 410 and 411 store cookie data 420 and 421, respectively. The individual cookie data 420 and 421 stored for each applet 410, 411 may be used by servers 150 and 151, respectively, in the same manner described above (e.g., to determine the subject-matter for applet content).

In addition, in this embodiment individual cookie data 420,421 may be exchanged between the applets 410, 411. For example, as illustrated in FIG. 4, applet 410 may read cookie data from applet 411's cookie file 421 (as well as it's own cookie file 420). One benefit achieved through this embodiment is that server 150 is provided with supplemental information about client 135's preferences, and can therefore transmit applet content which is more narrowly tailored to client 135's taste. It should also be noted that this embodiment effectively circumvents the limitation that one applet may only communicate to one Web server.

In one embodiment of the system, both server 150 and server 151 are advertisement servers that provide audio and/or video content to Web pages. In this embodiment, each of the cookie files 420,421 may contain different types of marketing data about client 135. For example (returning to the previous example) cookie 420 may contain data indicating that client 135 prefers outdoor activities. By contrast, cookie 421 may contain information on the airline that client 421 prefers to use when traveling. Accordingly, in response to the combined data, server 510 may provide an audio and/or video advertisement of reduced fares to wilderness destinations on client 421's favorite airline.

Figure 5:
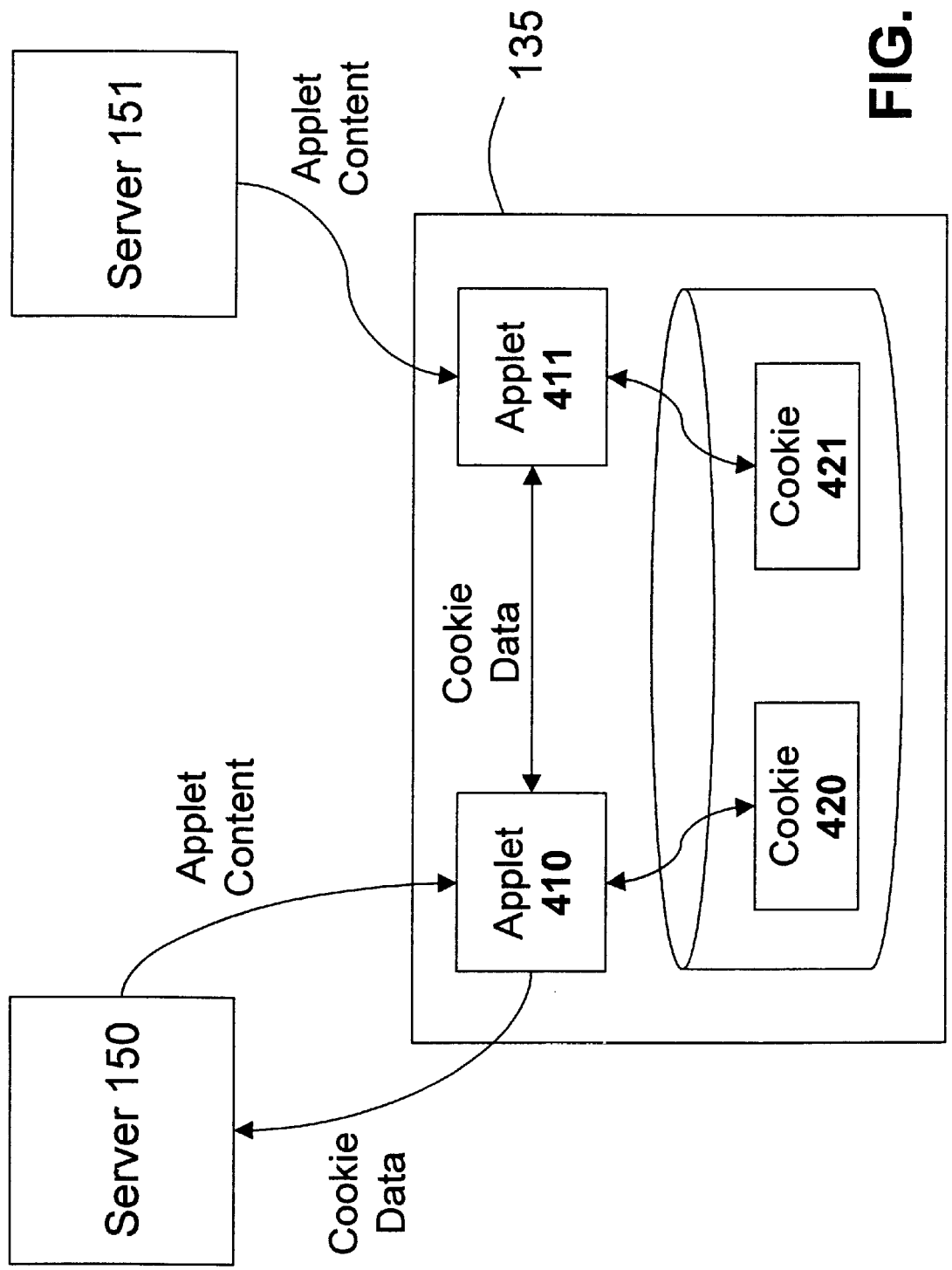
FIG. 5 illustrates another embodiment of a system for using cookies in Java.

Rather than reading the cookie data 421 of applet 411 directly, in the embodiment of the system illustrated in FIG. 5, applet 410 communicates directly with applet 411 to retrieve cookie data. Regardless of which embodiment of the system is implemented, however, the underlying principles remain the same.

Figure 6:
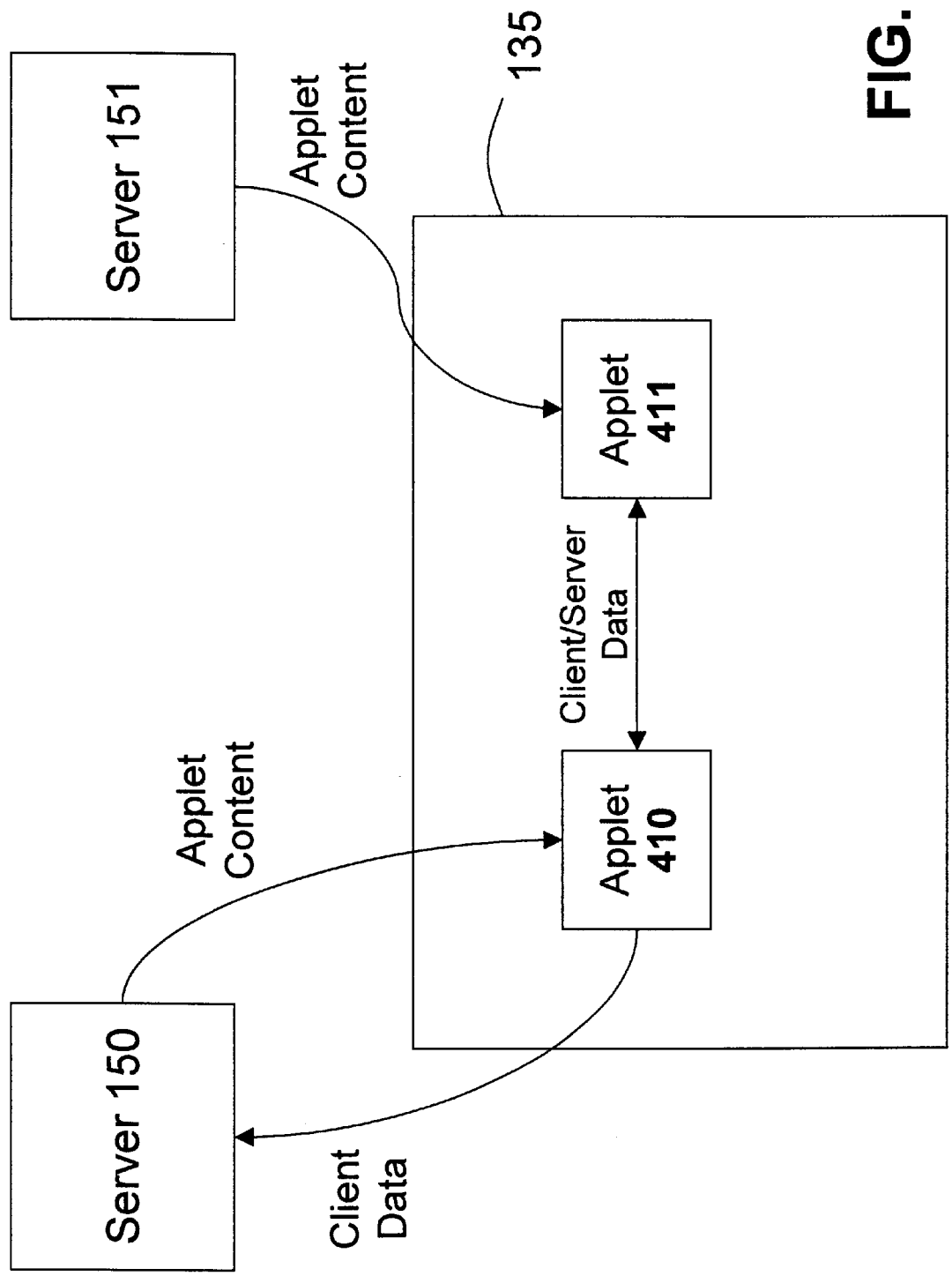
FIG. 6 illustrates an embodiment in which two applets exchange information directly.

In another embodiment, illustrated in FIG. 6, the two applets 410,411 exchange non-cookie data. Thus, if client 135 has cookies disabled on his computer, this embodiment will still allow server 150 to obtain information about client 135 collected by applet 411. This may be any of the types of information discussed above except in a non-cookie format.

Figure 7:
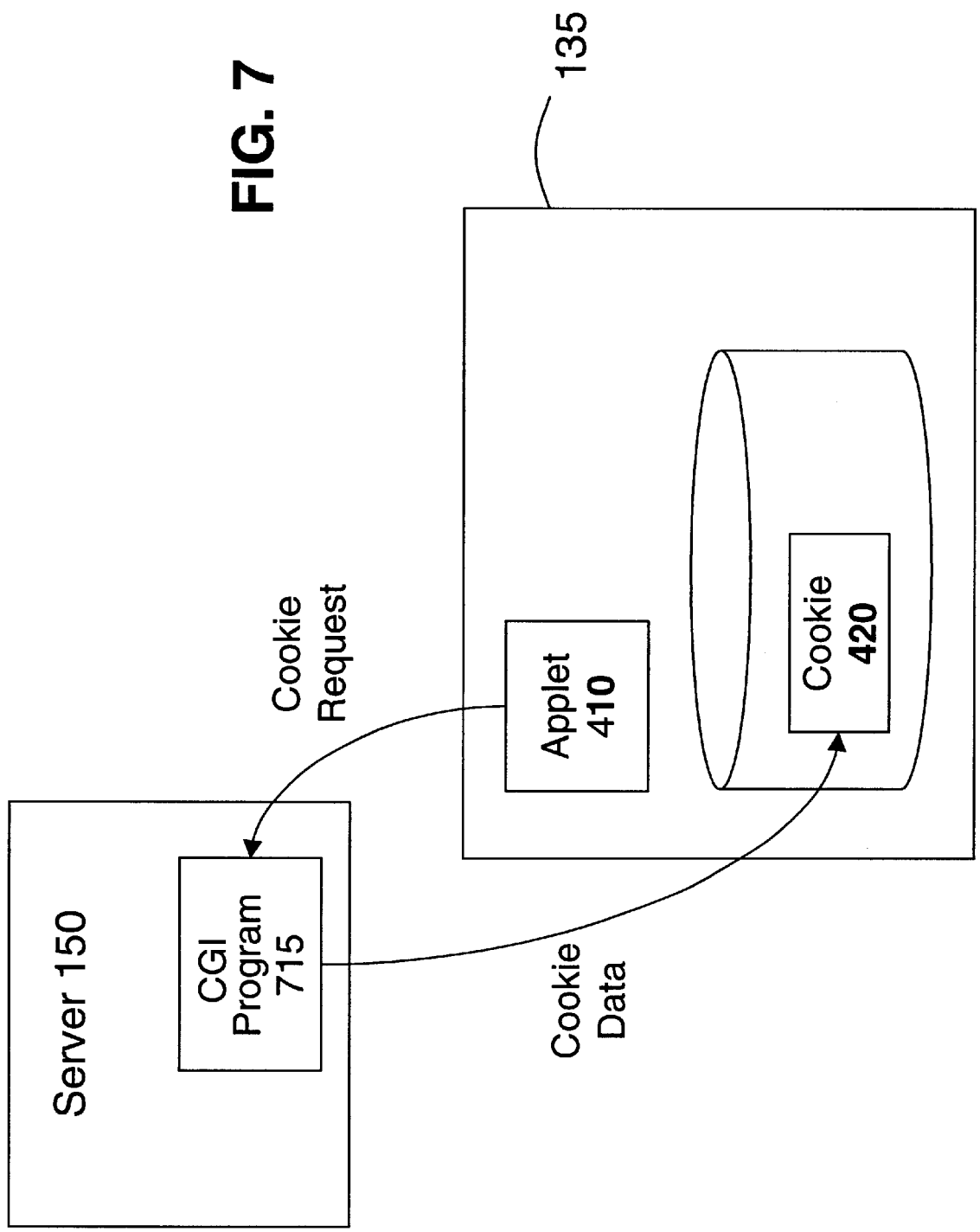
FIG. 7 illustrates an embodiment in which an applet causes cookie data to be stored indirectly.

In one embodiment of the system and method, the applet does not store or manipulate cookies directly. Rather, it makes a request back to the server and the server sets a cookie in the browser. For example, as illustrated in FIG. 7, the applet 410 may request that a cookie be sent from a common gateway interface ("CGI") program 710, which sets a cookie 420 in the browser (not shown). Subsequent requests from the browser or applet 410 will then return the cookie 420 to the server. Thus, in this embodiment, the applet 410 never directly manipulates the cookie 420, but by making the appropriate requests to the server 150, the applet 410 can cause the underlying browser to set/get the cookie 420. This embodiment is particularly useful for system where applets are not permitted (e.g., for security reasons) to read or write to the file system of the client 135. If the applet 410 needed the exact value of cookie 420, it might be sent to the applet 410 by the server 150 as text data.

Throughout the foregoing description, for the purposes of explanation, numerous specific details were set forth in order to provide a thorough understanding of the invention. It will be apparent, however, to one skilled in the art that the invention may be practiced without some of these specific details. For example, FIG. 3 illustrates two servers and a single client for implementing specific aspects of the invention. However, one of ordinary skill in the art will recognize that any number of servers (i.e., one or more) and/or clients may implement aspects of the invention. The systems illustrated in FIGS. 3 through 5 are merely a few exemplary embodiments. In addition, while the foregoing description focused on the Java programming language, other platform-independent programming languages may be used without departing from the underlying principles of the invention. Accordingly, the scope and spirit of the invention should be judged in terms of the claims which follow.

What is claimed is:

1. A system for using cookies in Java comprising a first server which:

transmits an applet to a client, said applet including content of a particular type and/or subject matter;

receives a message from said applet instructing said first server to store cookie data on said client;

subsequently interprets said cookie data to select the type and/or subject matter of applet content to transmit to said client the next time said first server transmits applet content to said client; and interprets cookie data stored by a second applet to select the type of applet content to transmit to said client, said second applet being transmitted to said client by a second server.

2. The system as claimed in claim 1 wherein said applet content type is digital audio content.

3. The system as claimed in claim 1 wherein said applet content type is digital video content.

4. The system as claimed in claim 1 wherein said first server is an advertisement server.

5. The system as claimed in claim 1 wherein said second server is an advertisement server.

6. The system as claimed in claim 1 wherein said applet is embedded in an HTML document.

7. A method for using cookies in Java comprising:

transmitting a first applet from a first server to a client, said first applet adapted to provide digital audio/video content to said client and to request that said first server store cookie data on said client relating to said client;

said first server storing said cookie data on said client in response to said request;

transmitting a second applet from a second server to said client, said second applet adapted to request that said second server store cookie data on said client relating to said client';

said first applet communicating directly with a second applet to retrieve said cookie data stored by said second server;

determining said client's preferences based on said cookie data stored by said second server and said first server;

said first applet instructing said first server to update said cookie data based on said client's preferences; and selecting additional audio/video content to transmit to said client based on said updated cookie data.

8. The method for using cookies in Java as claimed in claim 7 wherein said first applet exchanges non-cookie data with said second applet, said non-cookie relating to said client's preferences.

9. The method for using cookies in Java as claimed in claim 7 wherein said first server is an advertisement server.

10. The method for using cookies in Java as claimed in claim 7 wherein said second server is an advertisement server.

11. The system as claimed in claim 7 wherein said first applet is embedded in an HTML document.

12. An article of manufacture including a sequence of instructions stored on a machine-readable media which when executed by a processor cause the processor to:

retrieve a first Java applet from a first server, said first Java applet configured to cause said first server to store cookie data relating to a first client;

retrieve a second Java applet from a second server, said second Java applet configured to read said cookie data stored by said first server through direct communication of said cookie data from said first Java applet to said second Java applet.

13. The article of manufacture as in claim 12 comprising additional instructions which cause said processor to:

provide direct communication of non-cookie data from said first Java applet to said second Java applet.

14. The article of manufacture as claimed in claim 12 wherein said first server is an advertisement server.

15. The article of manufacture as claimed in claim 12 wherein said second server is an advertisement server.

16. The article of manufacture as claimed in claim 12 wherein said first applet is embedded in an HTML document.

\* \* \* \* \*